United States Patent Office 3,506,707
Patented Apr. 14, 1970

3,506,707
PREPARATION OF ACRYLAMIDOALKANE-SULFONIC ACIDS
Leonard E. Miller, Chagrin Falls, and Donald L. Murfin, Mayfield Heights, Ohio, assignors to The Lubrizol Corporation, Wickliffe, Ohio, a corporation of Ohio
No Drawing. Filed Feb. 1, 1968, Ser. No. 702,197
Int. Cl. C08f 37/00; C07c 103/08
U.S. Cl. 260—513         7 Claims

ABSTRACT OF THE DISCLOSURE

Acrylamidoalkanesulfonic acids are prepared by a two-step reaction sequence comprising first reacting an olefinic compound containing at least one allylic hydrogen atom with an acyl hydrogen sulfate to form a sulfonated intermediate, and subsequently reacting this intermediate with water and an acrylonitrile in the presence of sulfuric acid. The method is more convenient and gives better yields than the methods previously known.

---

This invention relates to the preparation of useful monomers, and more particularly to a method for the preparation of a compound of the formula

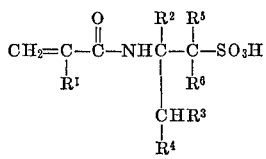

wherein $R^1$ is hydrogen or a lower alkyl radical and each of $R^2$, $R^3$, $R^4$, $R^5$ and $R^6$ is individually hydrogen or a hydrocarbon radical, which comprises (1) reacting an olefinic compound containing at least one allylic hydrogen atom with an acyl hydrogen sulfate to form a sulfonated intermediate, and subsequently (2) reacting said intermediate with water and a nitrile of the formula

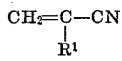

in the presence of sulfuric acid.

Acrylamidoalkanesulfonic acids and their salts are known to be useful for the preparation of copolymers suitable for a number of applications. The preparation of copolymers of these monomers is described, for example, in U.S. Patents 2,983,712 and 3,332,904. The acrylamidoalkanesulfonates are particularly useful for increasing the affinity of acrylonitrile copolymers for basic dyes.

The method described in the above-mentioned patents for the preparation of acrylamidoalkanesulfonic acids involves the reaction of an aminoalkanesulfonic acid with an acrylyl chloride. This method is cumbersome and results in low yields. A second method of preparation, involving the reaction of an olefin, sulfur trioxide and acrylonitrile in one step, is described in British Patent 1,090,779; this method, however, while suitable when used with saturated nitriles which serve as complexing agents for the sulfur trioxide, is inconvenient to the point of being nearly useless with acrylonitrile since the latter polymerizes in the presence of sulfur trioxide. Thus, the material obtained is a mixture of product and polymer which is very difficult to separate and which affords the acrylamidoalkanesulfonic acid in very small yield.

A principal object of the present invention, therefore, is to provide a new method for the preparation of acrylamidoalkanesulfonic acids and their salts in good yield and with a minimum of by-products.

A further object is to prepare acrylamidoalkanesulfonic acids by a method which involves a minimum of processing steps.

Other objects will in part be obvious and will in part appear hereinafter.

As indicated hereinabove, acrylamidoalkanesulfonic acids are prepared according to the method of this invention by a two-step reaction sequence involving a sulfonated intermediate. The starting material for this reaction sequence is an olefinic compound which has at least one allylic hydrogen atom (that is, a hydrogen atom attached to a carbon atom adjacent to the olefinic bond) and which may have one or more substituents, these substituents being described generally by the term "hydrocarbon radical" which includes alkyl, cycloalkyl and aryl radicals. As used herein, the term "hydrocarbon radical" also includes radicals containing other atoms and substituents which do not detract substantially from the hydrocarbon characteristics of the radical. Suitable substituents of this type include, for example, ether, ester, nitro and halogen radicals; also included are heterocyclic radicals such as the pyridine radical. The fact that aromatic substituents may be susceptible to nuclear sulfonation under the conditions of the reaction is not considered an obstacle to the operation of the method of this invention, and for this purpose the preparation of aryl-substituted acrylamidoalkanesulfonic acids, as more fully described hereinafter, is contemplated as being a part of this invention.

Examples of olefinic compounds which may be used in the method of this invention are propylene, 1-butene, 2-butene, isobutene, 1-pentene, 2-pentene, 1-decene, isooctene, α-methylstyrene, α-methylvinylpyridine, methyl methacrylate and the like. The preferred olefinic compounds are aliphatic olefinic hydrocarbons containing about 4–10 carbon atoms.

In the first step of the method of this invention, the olefin is reacted with an acyl hydrogen sulfate. While the exact molecular structure of the acyl hydrogen sulfate is not known with certainty and is not considered critical for the purpose of this invention, it may be conveniently represented by the formula

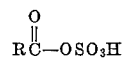

wherein R is a hydrocarbon radical, preferably an alkyl radical. The acyl hydrogen sulfate ordinarily used, for purposes of convenience and economy, is acetyl hydrogen sulfate.

Acetyl hydrogen sulfate may be prepared by the reaction of sulfuric acid with acetic acid and acetic anhydride. In general, the amount of acetic anhydride used should be at least sufficient to dehydrate all of the sulfuric acid to sulfur trioxide, which reacts with the acetic acid to form acetyl hydrogen sulfate. In most instances, an excess of acetic anhydride is used. This reaction is ordinarily carried out at a temperature below about 30° C., preferably about 0–20° C., desirably in the presence of the olefinic compound being sulfonated. It may sometimes be advantageous to add an inert solvent, primarily in order to depress the melting point of the mixture when a volatile olefin such as isobutylene is used. (Acetic acid melts at 16° C.) Preferable solvents for this purpose are the chlorinated lower aliphatic hydrocarbons such as methylene chloride, carbon tetrachloride, ethylene dichloride and the like.

In a preferred method for carrying out the first step, the acetyl hydrogen sulfate is prepared by the reaction of sulfur trioxide with acetic acid. Sulfur trioxide is conveniently available for laboratory use under the trade name "Sulfan." The reaction of acetic acid with sulfur trioxide is again most suitably carried out at about 0–30° C.

The sulfonation of the olefin is effected by merely adding the olefinic compound to the acetyl hydrogen sulfate, optionally in the presence of a suitable solvent which depresses the melting point of the mixture or merely serves as a diluent. The olefinic compound may be added during or after the formation of the acetyl hydrogen sulfate. The sulfonation ordinarily takes place at a temperature between about −20° and +25° C., preferably below about +10° C. In any event, the temperature should be low enough that all constituents of the mixture are liquids; thus, the sulfonation of isobutylene involves a maximum temperature of about −10° C. Since the yield in the sulfonation reaction is usually almost quantitative, equimolar amounts of sulfur trioxide and the olefin are ordinarily used.

The structure of the sulfonated intermediate formed during the first step is not known with certainty, and may vary depending upon the reaction conditions and the olefinic compound used. It is believed that the intermediate is an olefinic sulfonic acid, a hydroxy sulfonic acid or one or more kinds of cyclic compounds derived from said sulfonic acids; these possible structures are represented respectively by the following formulas.

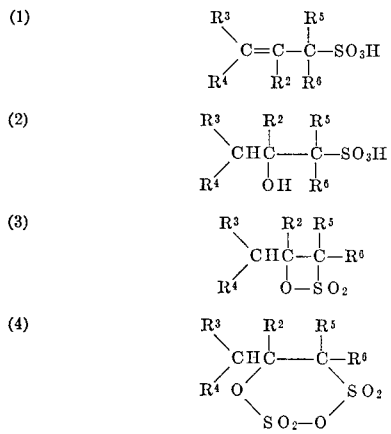

Studies of the reaction mechanism and the structure of the products formed indicate that the reaction mechanism involves an addition of sulfur trioxide across the olefinic bond (as shown in Formulas 3 and 4 above) followed by elimination and/or hydrolysis to cause a shift of the olefinic bond and the formation of a compound of the type represented by Formulas 1 and 2. If this is the case, the structure of the original olefin is

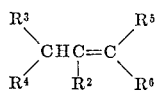

However, a simple allylic substitution may also take place as follows.

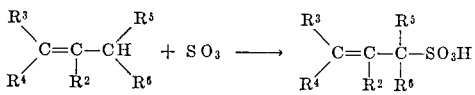

The invention is not to be taken as limited to either or both of these mechanisms, but includes any other reaction which may occur under the conditions recited, and the term "sulfonated intermediate" includes all compounds represented by Formulas 1–4 and any others which may be formed and react further as described herein.

Particularly if one or more $R^2$, $R^3$, $R^4$, $R^5$ and $R^6$ are aromatic radicals, a portion of the sulfur trioxide may react with the aromatic radical to form an aromatic sulfonic acid substituent. If such a reaction is likely, it is advantageous to use an excess of sulfur trioxide so as to provide enough sulfur trioxide to also form the desired sulfonated intermediate. Ordinarily, no more than one nuclear sulfonic acid substituent per aromatic radical will be formed owing to the deactivating defect of the sulfonic acid group on the aromatic ring. The method of the present invention includes the formation of acrylamidoalkanesulfonic acids containing additional sulfonic acid substituents in other positions on the molecule.

In the second step of the method of this invention, the sulfonated intermediate is reacted with water and a nitrile in the presence of sulfuric acid. The nitrile is an unsaturated nitrile represented by the formula hereinabove, in which $R^1$ is preferably hydrogen or methyl but may be another lower alkyl radical. As used herein, the term "lower alkyl" denotes alkyl radicals containing up to about 10 carbon atoms.

In general, for each mole of the sulfonated intermediate there are employed about 1–5 moles each of the nitrile, sulfuric acid and water. The use of an excess of the nitrile is preferred; this excess is most desirably about 2–3 moles per mole of the sulfonated intermediate. About 1–2 moles of water is ordinarily used, and the amount of sulfuric acid is preferably equal to the number of moles of the sulfonated intermediate although an excess may be used in some occasions. The reaction ordinarily proceeds most effectively in the absence of a solvent and at temperatures of about 10–50° C., although the reaction temperature is not critical. The reaction is generally exothermic and proceeds satisfactorily without the application of external heat; in some instances, cooling may be desirable.

The acrylamidoalkanesulfonic acid may be recovered in the free state or in the form of a salt, preferably an alkali metal or ammonium salt. The ammonium salt is conveniently isolated by diluting the reaction mixture and neutralizing it with anhydrous ammonia or with ammonium hydroxide; if an organic solvent such as methanol is used to dilute the mixture and if anhydrous ammonia is used to neutralize it, the ammonium salt usually precipitates and can be easily recovered merely by filtration.

The products of the method of this invention are generally crystalline solids which may be purified, if desired, by recrystallization from a suitable solvent.

The method of this invention is illustrated by the following examples.

EXAMPLE 1

Sulfur trioxide, 160 parts (2 moles), is added dropwise to 360 parts of acetic acid at 15° C. When the addition is complete, the reaction mixture is allowed to warm to room temperature and is stirred for two hours. The resulting solution of acetyl hydrogen sulfate is light yellow to colorless.

To a solution of 240 parts of acetic acid and 340 parts of methylene chloride, maintained at −10° C., there is added 112 parts (2 moles) of isobutylene over 30 minutes. The isobutylene is added through a gas inlet tube which dips below the surface of the acetic acid-methylene chloride mixture. While the temperature is maintained at −10° C., the acetyl hydrogen sulfate solution is added dropwise. An exothermic reaction occurs during the addition. After the acetyl hydrogen sulfate has been added, the mixture is allowed to warm to room temperature and is stirred for two hours. It is then cooled and 54 parts (3 moles) of water is added slowly, followed by 212 parts (4 moles) of acrylonitrile and 200 parts (2 moles) of 96% sulfuric acid. When all the reagents have been added, the mixture is heated to 40° C. for 48 hours. It is then cooled to 20° C. and filtered. The white crystalline precipitate is collected by filtration, washed with acetic acid, recrystallized from acetic acid and dried under vacuum at 60° C. for two days. There is obtained 269 parts (65% of the theoretical amount) of the desired 2-acrylamido-2-methylpropane-1-sulfonic acid, which melts at 184–186° C.

EXAMPLE 2

The procedure of Example 1 is repeated except that 2 moles of 2-butene is substituted for the isobutylene. The product is 2-acrylamido-1-methylpropane-1-sulfonic acid.

EXAMPLE 3

The procedure of Example 1 is repeated except that 2 moles of 1-decene is substituted for the isobutylene and the temperature of the sulfonation reaction is 10° C. The product is a methacrylamidodecanesulfonic acid.

EXAMPLE 4

The procedure of Example 1 is repeated except that the isobutylene is replaced by 2 moles of α-methylstyrene and the amount of sulfur trioxide used is 4 moles. The sulfonation reaction is carried out at 10° C. The product is a mixture of 2-acrylamido-2-phenyl-1-propanesulfonic acids in which the phenyl radical contains one sulfonic acid substituent in the ortho or para position.

EXAMPLE 5

The procedure of Example 1 is repeated, except that the isobutylene is replaced with 2 moles of methyl methacrylate and the sulfonation reaction is carred out at 10° C. The product is 2-acrylamido-2-carbomethoxypropane-1-sulfonic acid.

EXAMPLE 6

A solution of 2 moles of 100% sulfuric acid (prepared by mixing 3.3 moles of 96% sulfuric acid and 0.7 mole of 30% fuming sulfuric acid) in 600 parts of acetic acid is cooled to 5° C. and 112 parts (2 moles) of isobutylene is passed into the solution. Acetic anhydride, 306 parts (3 moles), is then added dropwise, after which the solution is heated to 40° C. for 1 hour. Water, 72 grams, is then added to hydrolyze the excess acetic anhydride.

The mixture is cooled to room temperature and 204 parts (4 moles) of acrylonitrile is added. The remainder of the reaction is carried out as described in Example 1, yielding 215 grams (52% of the theoretical amount) of 2-acrylamido-2-methylpropane-1-sulfonic acid.

EXAMPLE 7

The procedure of Example 1 is repeated except that the isobutylene is replaced by 2 moles of β-methyl-2-vinylpyridine and the amount of sulfur trioxide used is 4 moles. The sulfonation reaction is carried out at 10° C. The product is 2-acrylamido-2-(2-pyridyl)-1-propanesulfonic acid.

What is claimed is:

1. A method for the preparation of a compound of the formula

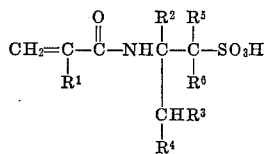

wherein $R^1$ is hydrogen or a lower alkyl radical and each of $R^2$, $R^3$, $R^4$, $R^5$ and $R^6$ is individually hydrogen or an alkyl radical, which comprises (1) reacting an aliphatic olefinic hydrocarbon containing about 4–10 carbon atoms and at least one allylic hydrogen atom with an acyl hydrogen sulfate wherein the acyl group is derived from an alkyl carboxylic acid to form a sulfonated intermediate, and subsequently (2) reacting said intermediate with water and a nitrile of the formula

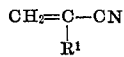

in the presence of sulfuric acid; about 1–5 moles each of said nitrile, water and sulfuric acid being employed per mole of said sulfonated intermediate.

2. The method of claim 1 wherein the nitrile is acrylonitrile or methacrylonitrile.

3. The method of claim 2 wherein the acyl hydrogen sulfate is acetyl hydrogen sulfate.

4. The method of claim 3 wherein the olefinic hydrocarbon is isobutylene.

5. The method of claim 4 wherein the isobutylene is sulfonated at a temperature between about —20° and —10° C., in the presence of an inert solvent which lowers the melting point of the reaction mixture.

6. The method of claim 5 wherein the solvent is a chlorinated lower aliphatic hydrocarbon.

7. A method for the preparation of a compound of the formula

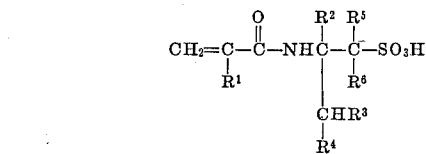

wherein $R^1$ is hydrogen or a lower alkyl radical and each of $R^2$, $R^3$, $R^4$, $R^5$ and $R^6$ is individually hydrogen or an alkyl, cycloalkyl or aryl radical, which comprises (1) reacting an olefinic hydrocarbon of the formula

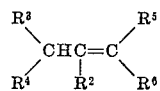

with an acyl hydrogen sulfate wherein the acyl group is derived from an alkyl carboxylic acid to form a sulfonated intermediate, and subsequently (2) reacting said intermediate with water and a nitrile of the formula

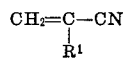

in the presence of sulfuric acid; about 1–5 moles each of said nitrile, water and sulfuric acid being employed per mole of said sulfonated intermediate.

References Cited

UNITED STATES PATENTS

| | | | |
|---|---|---|---|
| 2,061,617 | 11/1936 | Downing et al. | 260—513 |
| 3,235,549 | 2/1966 | Brovssalian. | |

FOREIGN PATENTS 1,090,412  11/1967  Great Britain.

DANIEL D. HORWITZ, Primary Examiner

U.S. Cl. X.R.

8—55, 86; 260—79.3, 503, 508, 509, 327, 294.8, 481